United States Patent Office 2,904,668
Patented Sept. 15, 1959

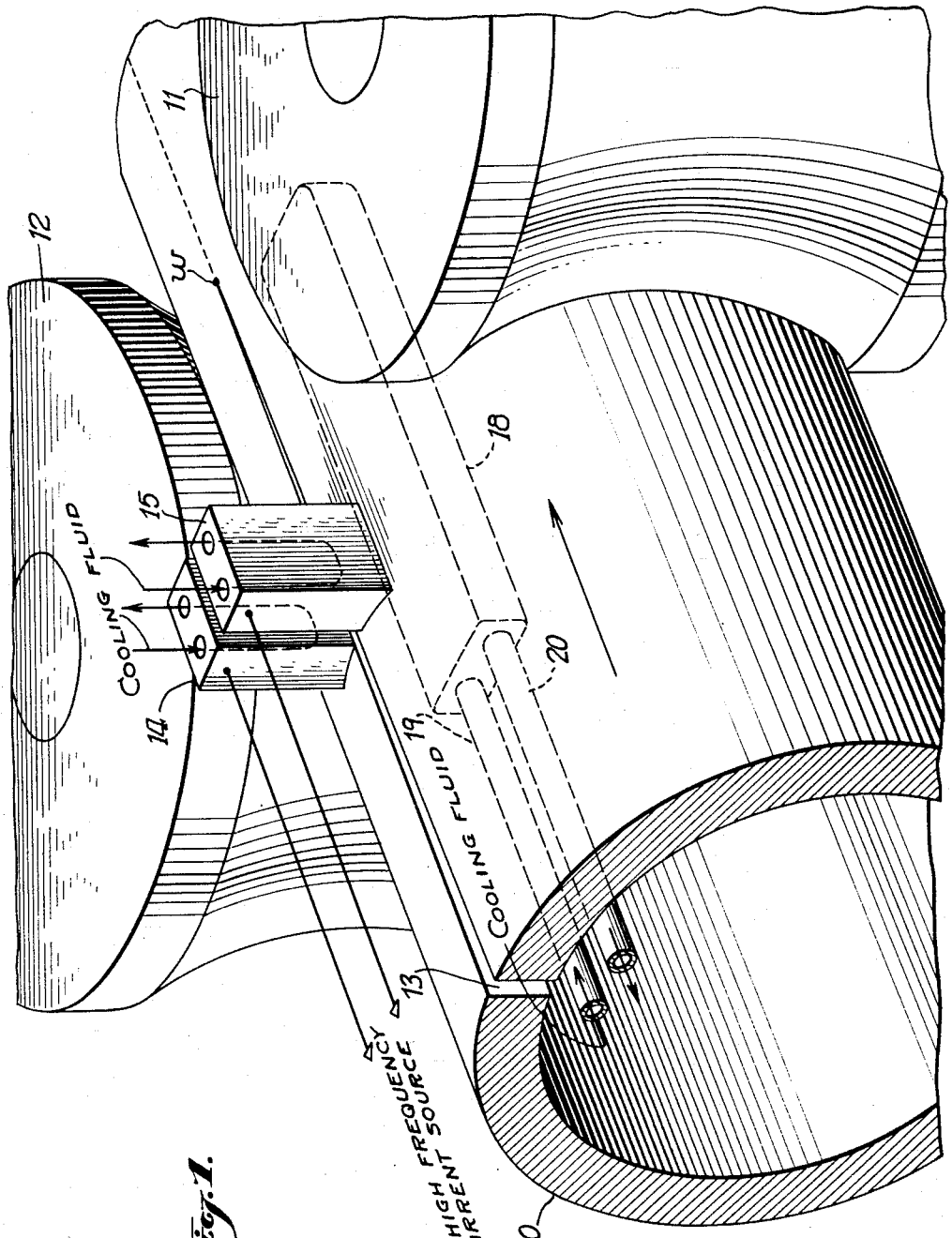

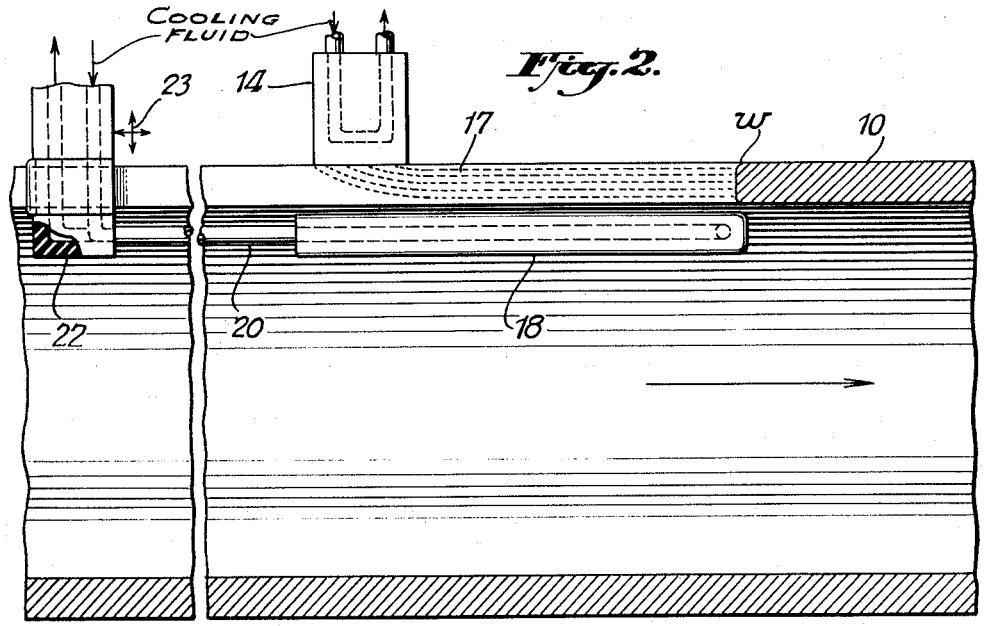
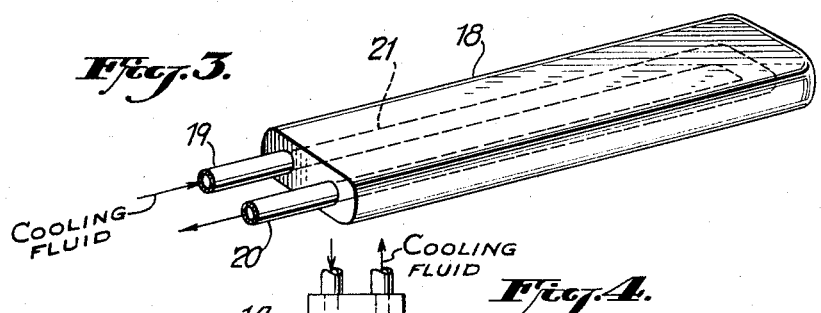
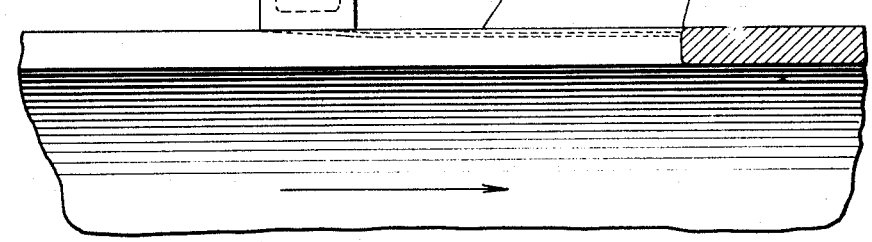

2,904,668

WELDING OF METAL STRIPS AND TUBING

Wallace C. Rudd, Larchmont, and Robert J. Stanton, Brooklyn, N.Y., assignors to Magnetic Heating Corp., New Rochelle, N.Y., a corporation of New York Application October 7, 1958, Serial No. 765,869

5 Claims. (Cl. 219—67)

This invention relates to methods and apparatus for welding seams in metal tubing or the like and for the welding together of the edges of strips or other metal portions. The invention is particularly adapted for the welding of metal portions which are relatively thick along the edges or bands thereof which are to be welded together.

This application comprises a continuation-in-part of applicants' copending application Serial No. 638,566, filed February 6, 1957 (Patent No. 2,857,503 issued October 21, 1958) to which reference is hereby made, the present invention being directed to certain aspects of the apparatus referred to but not claimed in said copending application.

In accordance with the invention of said patent, longitudinal seams in tubing or between the longitudinal edges of strips or other metal portions may be welded together as same are advanced past a weld point by applying high frequency current thereto in advance of the weld point, which current flows along the edges to be welded for a sufficient distance and with sufficient intensity prior to the weld point to bring the edges to be welded up to welding temperature. The current is applied to the edges by contacts slidably engaging the metal adjacent to or between the edges.

But if the metal of the edges is relatively thick, there will be a tendency for the current to become more concentrated along the upper portions of the edges if the contacts engage such upper portions, and thus the lower portions of the edges will not become heated to welding temperature upon reaching the weld point (or strictly speaking the vertical line at which the welding between the edges occurs and which for brevity will be herein referred to as the "weld point"). However, as explained in connection with Fig. 10 of said patent, if a strip or block of high conductivity non-magnetic metal, such as copper, is placed along, below and adjacent the edges which are to be welded but in slightly spaced relation thereto, then the impedance to the high frequency current flowing in the metal portions to be welded and which are nearest such high conductivity strip, will be substantially reduced as compared with the situation which would prevail if such a strip or block of copper were not present.

More specifically according to a preferred embodiment of the present invention the terminals of a high frequency current source are applied to contacts which engage respectively exposed surfaces on opposite sides of a narrow V-shaped gap between the advancing metal portions to be welded so that the path of current thereon is from such contacts, along on the gap edges to and from the weld point. And in order to cause such current to flow over the full depth of the edges in such V-shaped gap, a block of metal of high conductivity, such as of copper or silver, is mounted to extend along closely to such gap in advance of the weld point on the side thereof opposite to that where the contacts are located. That is to say, if the contacts engage the upper surfaces of the approaching gap edges, then the high conductivity block or strip is positioned closely beneath the underside of the gap.

Contrary to what might be assumed from superficial consideration of the matter, the use of such non-magnetic high conductivity blocks or strips in the manner above referred to with currents of the high frequencies here involved is surprisingly effective in reducing the impedance of the adjacent metal portions to be welded and thus highly effective in causing the current to flow over the full depth of the edge surfaces and thus causing them to be uniformly heated to the requisite welding temperature. On the other hand, if similar blocks or strips but of magnetic material are provided in accordance with other and quite different aspects of the invention of said patent, then the effect is substantially the opposite from that attainable with strips of high conductivity non-magnetic metal, that is, the impedance of the metal portions adjacent thereto will be greatly increased rather than being decreased.

In the welding of tubing having walls or strips which are relatively thick, the metal as a consequence will be relatively rigid and as the metal portions are advanced to and past the weld point the portions cannot be easily held deflected apart in advance of the weld point by any substantial distance or so as to come together at any very substantial angle such as would afford the possibility of placing the high frequency contacts down into a gap therebetween to try to ensure proper current flow along both the upper and lower portions of the edges to be welded. Thus with such relatively thick metal it is difficult or impossible to apply the high frequency contacts other than to the exposed surfaces outside the gap. For these reasons the present invention makes possible the welding of thick-walled tubes or thick strips which could not otherwise be welded by the general methods here involved, at least uniformly and efficiently, throughout the depth of the weld. While it would be possible to start applying the current so far in advance of the weld that the edges might be heated to welding temperature throughout their depth, the heating would still not be uniform to the full depth of the edges and also the heating time would then be so long that there would be a considerable wasteful thermal flow into the metal to regions remote from the desired line of the welded seam or else the parts to be welded would have to be advanced so relatively slowly that similar difficulties would occur. With the present invention, however, proper heating to the full depth of the seam is made possible at high speed and with the contacts located as close as from 2 to 4 inches, in typical cases, in advance of the weld point and thus the heating time is so brief that flow of heat into metal away from the line of the seam is minimized.

Various further and more specific objects, features and advantages of the invention will appear from the description given below, taken in connection with the accompanying drawings illustrating by way of example a preferred form of the invention.

In the drawings:

Fig. 1 is a perspective and somewhat schematic view illustrating the principal features of the invention;

Fig. 2 is a vertical sectional view, the section being taken through the line of the desired seam to be welded, and the current flow to the full depth of the seam as made possible by the invention being indicated by dotted lines;

Fig. 3 is a perspective view showing the high conductivity element used in the apparatus; and Fig. 4 is a view similar to Fig. 2 but illustrating by dotted lines the general pattern of the current flow which will occur when the present invention is not utilized.

Referring to the drawings in further detail, a length of metal tubing is indicated at 10 as it advances in the direction indicated by the arrow through a tube mill having pressure rollers as at 11, 12 of a known type for pressing the tube edges which are to be welded together into contact at or adjacent the "weld point" w. That is, in practicing the invention in the manner shown in Fig. 1, the tubing as it advances has previously been shaped in generally tubular form but has a longitudinal gap 13 and in cases such as here involved where the metal is relatively thick, such gap will generally be quite narrow, for example, in the neighborhood of 1/10 inch and too small to permit the current applying contacts to be located therein. The pressure rollers, such as indicated at 11, 12, or some other equivalent means serve not only to bring the gap edges together at or adjacent the weld point but also, if desired, to advance the tubing at a high rate of speed which may vary under different conditions, for example, from several feet per minute to about 100 feet per minute.

According to the embodiment of the invention shown in Fig. 1, heating current of a radio frequency is brought from a suitable current source and its terminals connected respectively to contacts 14, 15 which, as explained in the above-mentioned patent, should be suitably fluid cooled as by fluid-cooling cavities therein as indicated. Thus the high frequency will flow respectively from these contacts along the approaching gap edges to and from the weld point w, but if no further measures are taken, such current would tend to be more or less concentrated along the upper portions of the approaching gap edges as indicated by dotted lines 16 in Fig. 4. To avoid this difficulty and to cause the current flow to extend over the full depth of the edges as shown by the dotted lines at 17 in Fig. 2, a mass, block or strip of high conductivity non-magnetic material as at 18 is positioned to extend along in closely spaced relation to and beneath the gap. This strip may, for example, be formed of high conductivity copper, silver or other material having high conductivity.

As indicated in Fig. 3, the member 18 is preferably fluid cooled, for example, by use of water inlet and outlet connections 19 and 20 communicating with a cavity 21 in the member. These connections may also be used as supports for the member and may extend into and up through a suitable gap spreader means 22 of a known type (Fig. 2) which will act as a support for the member 18. Suitable supporting means (not shown) for such spreader may be provided preferably of a form which will be adjustable in vertical and horizontal directions as indicated by the arrows 23.

It will be understood that similar equipment similarly arranged may be used for welding together two advancing strips or other metal portions, that is, the two strips would be advanced with a narrow V-shaped gap therein preceding the weld point where the pressure rolls would press the strips firmly into welding engagement in the manner indicated in Figs. 12–17 of the above-mentioned patent.

While sometimes herein and in the appended claims reference is made to the "upper" and "lower" surfaces of the metal portions to be welded, it will be understood that these terms are used relatively, that is to say, to identify the relative positions of the surface portions intended and as shown in the accompanying drawings, it being understood that the equipment might be mounted in various positions with respect to the floor level and different from or even inverted as compared with the manner in which same is here shown.

The invention is particularly well adapted for welding tubing having a wall thickness or strips having a thickness of, for example, 1/4 inch up to 1/2 inch or more and in typical cases as above noted, the contacts 14, 15 may be spaced back from the weld point by a distance of about 2 inches up to 4 inches in which event the width of the V-shaped gap at the contacts would be in the neighborhood of 1/10 inch more or less and thus too narrow to permit placing the contacts down within the gap.

The high conductivity member 18 in typical cases may be adjustably positioned, for example, at a distance preferably in the neighborhood of 1/16 inch below the lowest portions of the edges to be heated and such member should extend forwardly from the region beneath the contacts 14, 15 to a region which is beneath the weld point or thereabouts. The member 18 may be of a width such as to overlap the width of the gap at each side by about 1/4 inch more or less in typical cases.

As specified in the above-mentioned patent, the current used is preferably of a radio frequency, such, for example, as a frequency of the order of 100,000 cycles per second or up to 300,000 to 400,000 cycles per second or higher. As the frequency is increased above about 50,000, the efficiency of the method and quality of the weld is rapidly improved for the reason that the heating to welding temperature becomes more and more concentrated (according to a square root relation) within an extremely thin layer of the metal on the very edge surfaces to be welded, leaving the metal in back thereof firm so that the welding surfaces may be very effectively forged together without noticeable disruption of the crystalline structure of the metal. The method and apparatus of this invention are especially well adapted for the welding of steel tubing or strips, but may also be used with advantage for welding copper or aluminum or alloys thereof, among other metals.

While the invention has been described above as applied to the welding of metal portions as separated by a narrow V-shaped gap (such as the gap shown with the apparatus of Figs. 12–17 of the above-mentioned patent) and with the opposite terminals of the current source applied to opposite sides of said gap, some advantage may be obtained by practicing the invention with the alternative contact arrangements and with the gap closed or open as in other figures of said patent.

Upon adjusting the proximity of the high conductivity member 18 with respect to the metal portions to be welded, it will be understood that the depths to which the current flows on the thick edges with full intensity may be varied so that, for example, the outer portions of the weld on a length of tubing may be heated and softened slightly more than the inner portions of the weld while still bringing such inner portions up to welding temperature (or the reverse may be accomplished) whereby the "upset" of the weld may be largely directed upwardly or, if preferred, downwardly.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding a seam extending along opposed edges of two relatively thick elongated metal portions, which comprises: advancing said portions with their said edges passing along the line of the desired seam and past a weld point; firmly retaining said edges together as they reach the region of such weld point; conducting high frequency current onto upper surfaces of said metal portions adjacent said line and in advance of said weld point to maintain over a distance substantially in advance of said weld point flows of said current for progressively heating said edges up to welding temperature when same reach said weld point, and causing said flows of current to extend over substantially the full depth of said edges by maintaining near the undersurfaces of said metal portions and adjacent said edges a mass of non-magnetic highly conductive material effective relatively to decrease the reactance of the current paths on the lower portions of said edges as compared with the reactance, for said high frequency, of the upper portions of said edges.

2. Method for welding together the edges adjacent a longitudinal gap in metal tubing having relatively thick walls, which method comprises: advancing the tubing with said edges passing along the line of the desired welded seam and past a weld point; firmly retaining said edges together as they reach the region of such weld point; conducting high frequency current onto the outer surface of the tubing adjacent said line and in advance of said weld point to maintain over a distance substantially in advance of said weld point flows of said current for progressively heating said edges up to welding temperature when same reach said weld point, and causing said flows of current to extend over substantially the full depth of said edges by maintaining near the inner surface of the tubing adjacent said edges a mass of non-magnetic highly conductive material effective relatively to decrease the reactance of the current paths on the inner portions of said edges as compared with the reactance, for said high frequency, of the outer portions of said edges.

3. Method for welding together the edges adjacent a longitudinal gap in metal tubing having relatively thick walls, which method comprises: advancing the tubing with said edges passing along the line of the desired welded seam and with a narrow V-shaped gap therebetween, and thence past a weld point; firmly retaining said edges together as they reach the region of such weld point; applying electrodes connected respectively to the terminals of a high frequency current source onto outer surfaces of the tubing on opposite sides of said gap and in advance of said weld point to maintain over a distance substantially in advance of said weld point flows of said current from the electrodes to and from the weld point for progressively heating said edges up to welding temperature when same reach said weld point, and causing said flows of current to extend over substantially the full depth of said edges by maintaining near the inner surface of the tubing and adjacent said gap a mass of non-magnetic highly conductive material effective relatively to decrease the reactance of the current paths on the inner portions of said edges in the gap as compared with the reactance, for said high frequency, of the outer portions of said edges in the gap.

4. The apparatus for welding a seam extending along opposed edges of two relatively thick elongated metal portions, comprising in combination: means for advancing said portions with their said edges passing along the line of the desired seam and past a weld point; opposed means for pressing said portions together whereby their said edges are firmly retained together as same pass the region of such weld point; contacts adapted to be connected to the terminals of a source of high frequency current, said contacts being positioned to engage upper surfaces of said metal portions adjacent the said line for conducting such high frequency current onto said portions to maintain over a distance substantially in advance of said weld point flows of said current for progressively heating said edges up to welding temperature upon reaching said weld point; and means for causing said flows of current to flow over the full depth of said edges, said latter means comprising a mass of non-magnetic highly conductive material mounted in proximity to the undersurfaces of said metal portions and adjacent said edges, such mass being effective relatively to decrease the reactance of the current paths on the portions of said edges nearest said mass as compared with the reactance, for said high frequency current, of the upper portions of said edges.

5. The apparatus for welding together the edges adjacent a longitudinal gap in metal tubing having relatively thick walls, such apparatus comprising in combination: means for advancing the tubing with their said edges passing along the line of the desired seam and with a narrow V-shaped gap therebetween, and thence past a weld point; opposed means for pressing said edges together as same reach the region of such weld point; contacts respectively adapted to be connected to the terminals of a source of high frequency current, said contacts being positioned to engage outer surfaces of the tubing at opposite sides of said gap for conducting such high frequency current to flow from said contacts along on said edges to and from the weld point to maintain over a distance substantially in advance of said weld point flows of said current for progressively heating said edges up to welding temperature upon reaching said weld point; and means for causing said flows of current to flow over substantially the full depth of said edges, said latter means comprising a mass of non-magnetic highly conductive material mounted in proximity to the inner surfaces of the tubing and adjacent said edges, such mass being effective relatively to decrease the reactance of the current paths on the portions of said edges in the gap nearest said mass as compared with the reactance, for said high frequency current, of the outer portions of said edges in the gap.

References Cited in the file of this patent

UNITED STATES PATENTS

| | | |
|---|---|---|
| 2,024,906 | Bennett | Dec. 17, 1935 |
| 2,066,668 | Bennett | Jan. 5, 1937 |
| 2,833,910 | Stanton et al. | May 6, 1958 |